United States Patent Office 3,513,717
Patented May 26, 1970

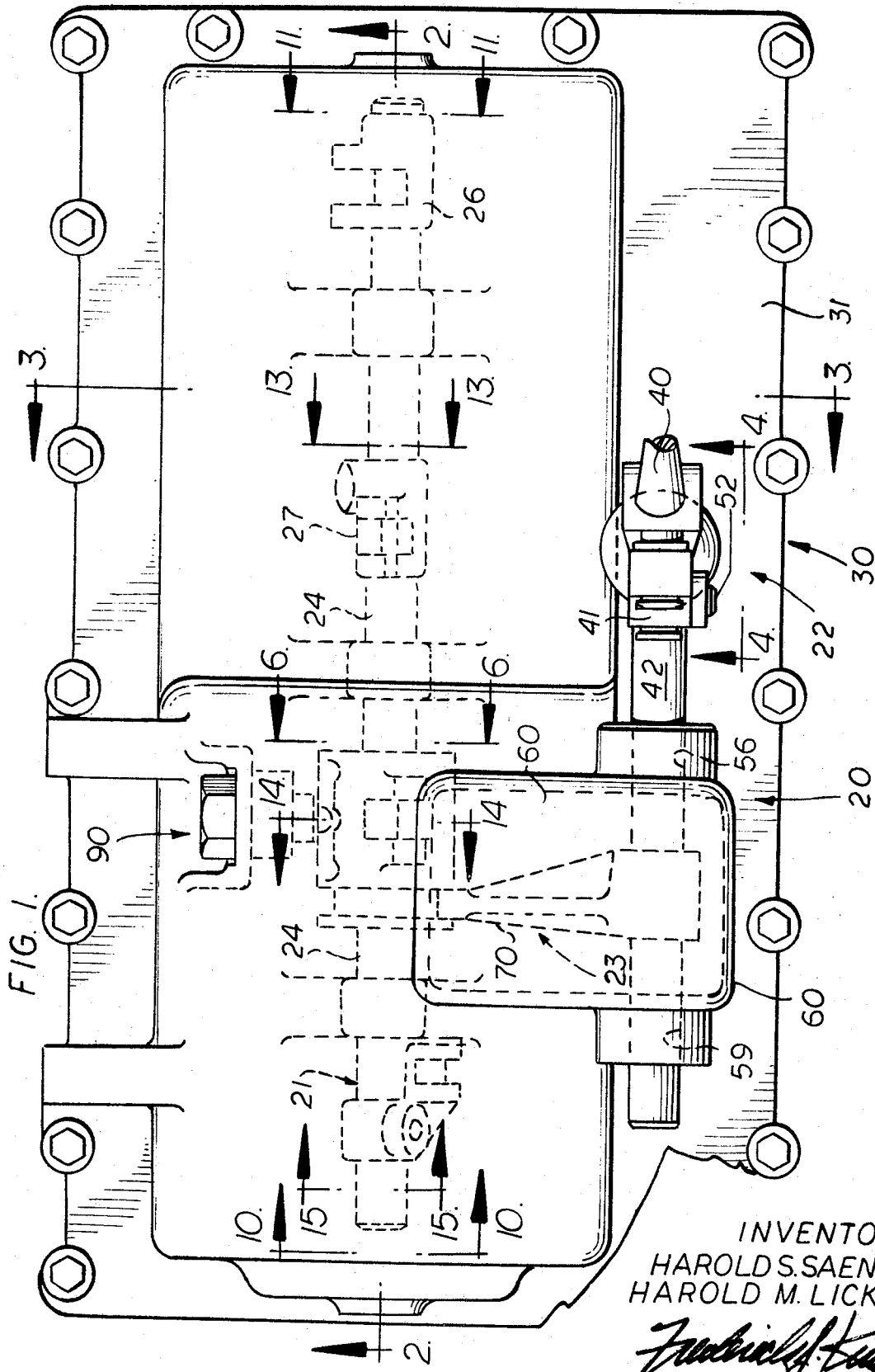

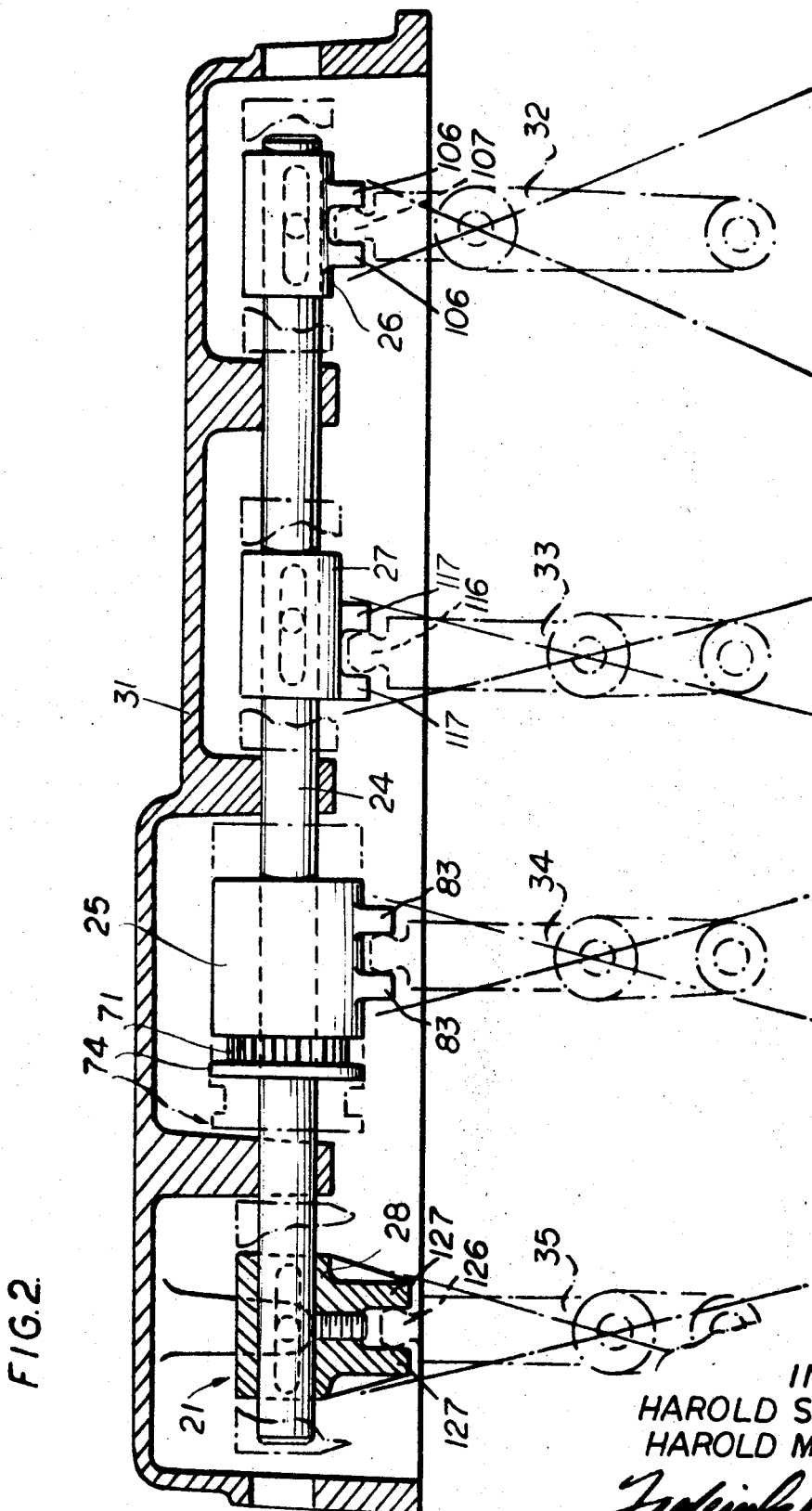

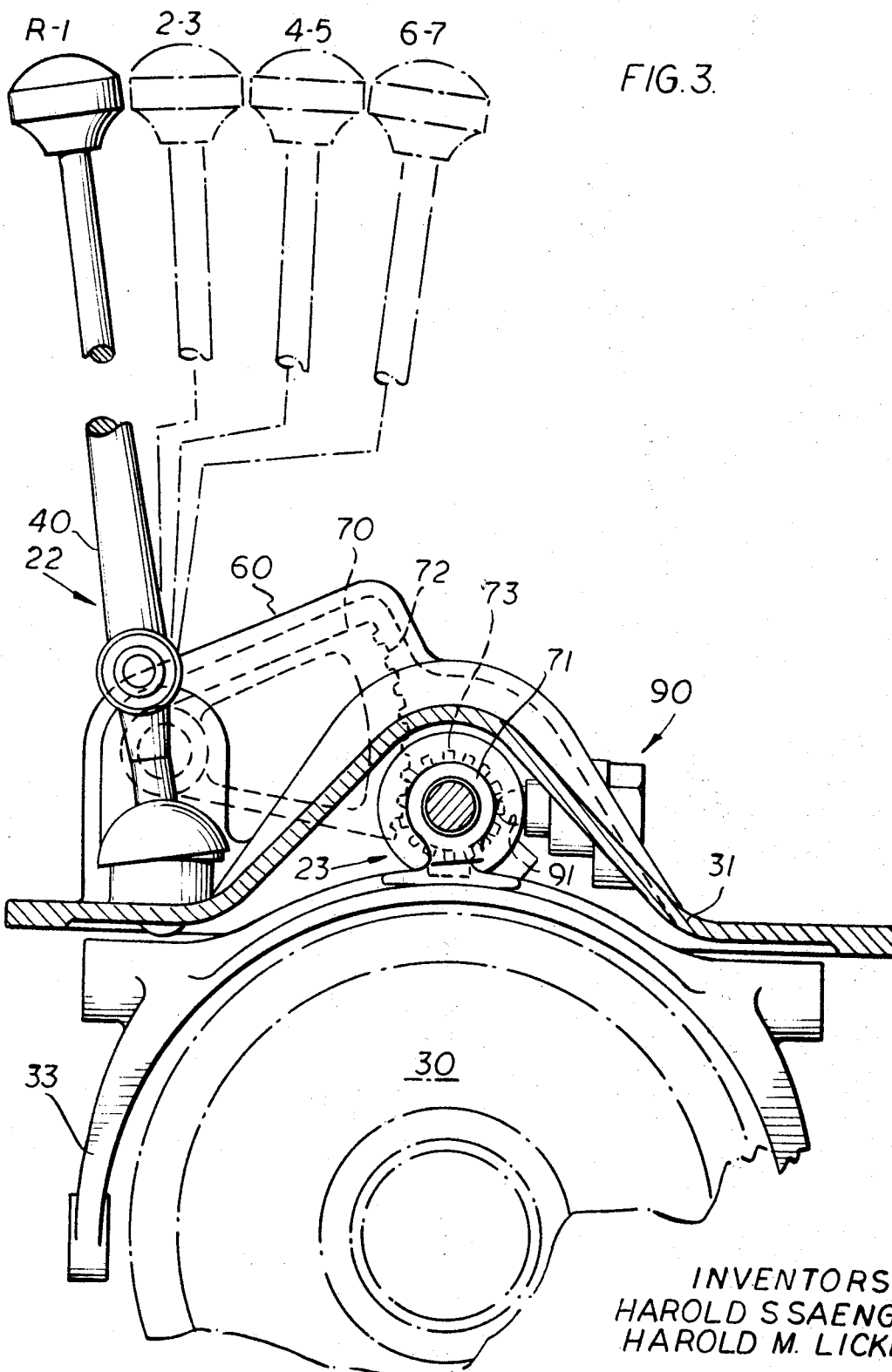

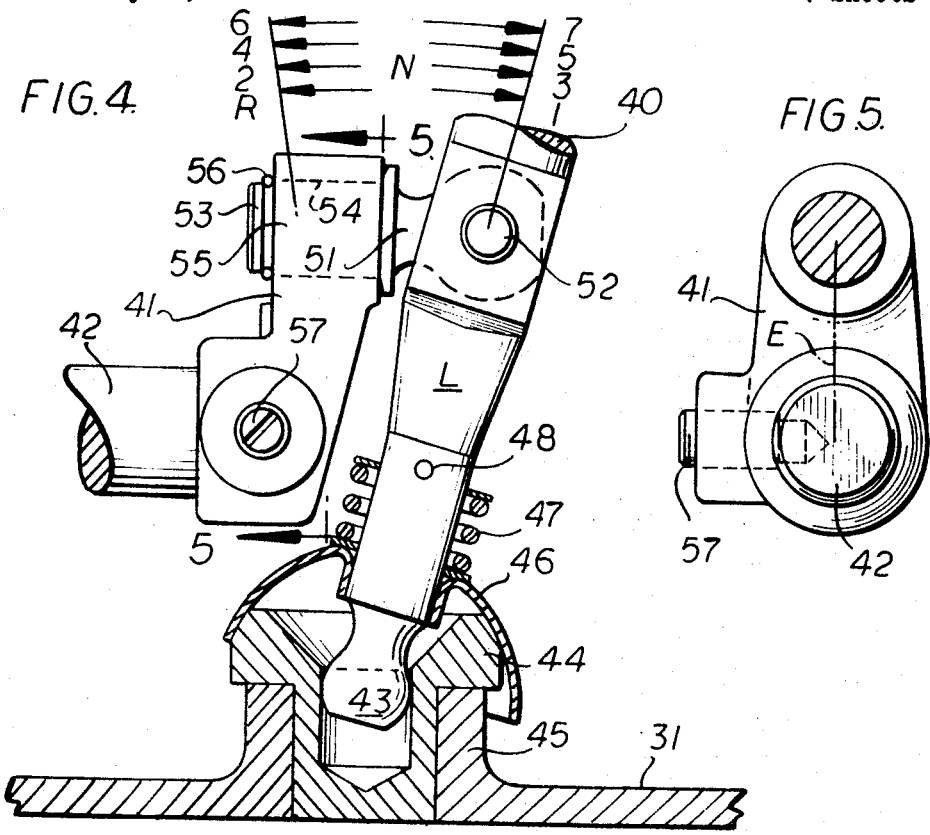
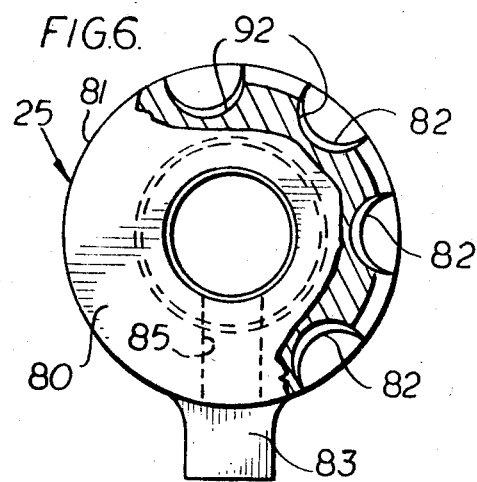
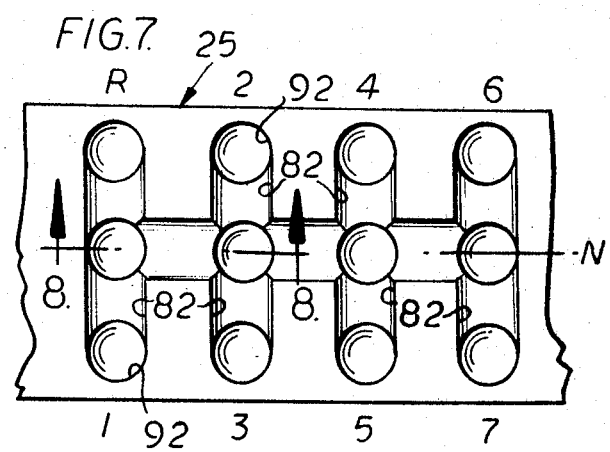
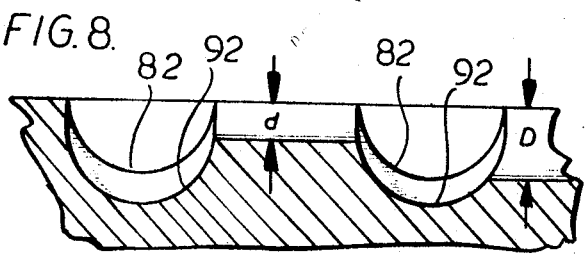

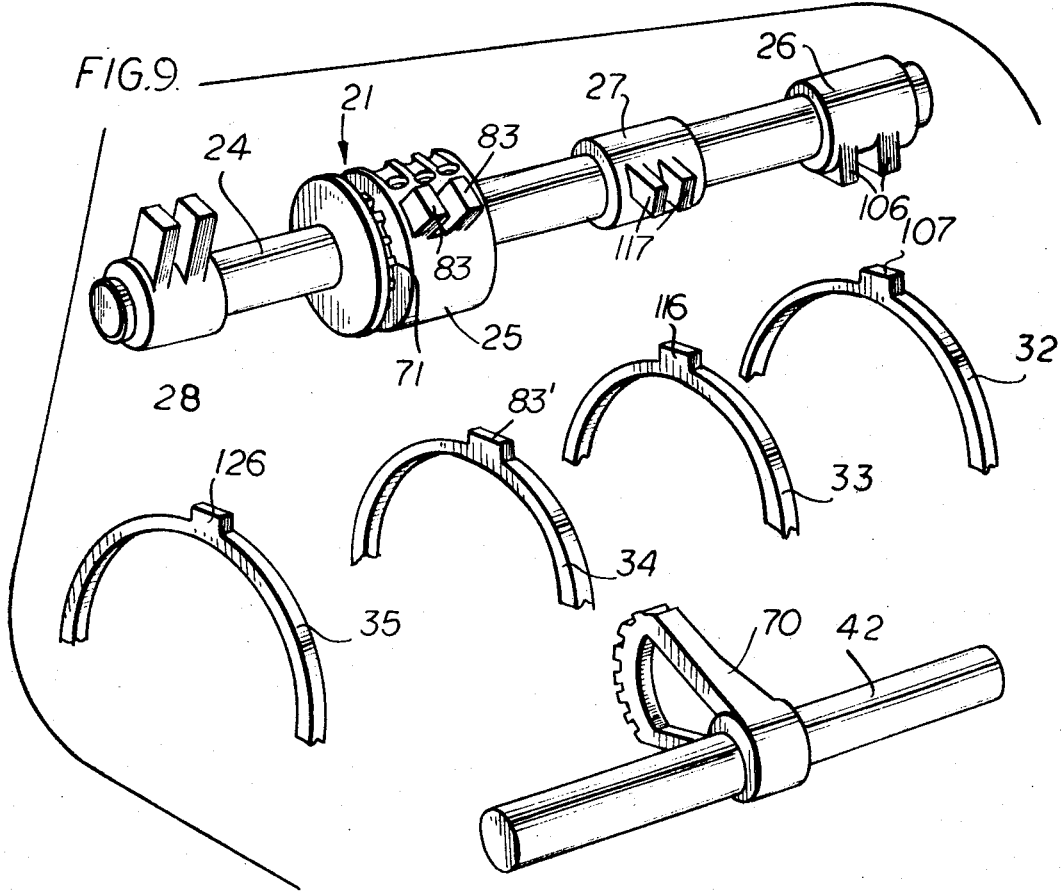
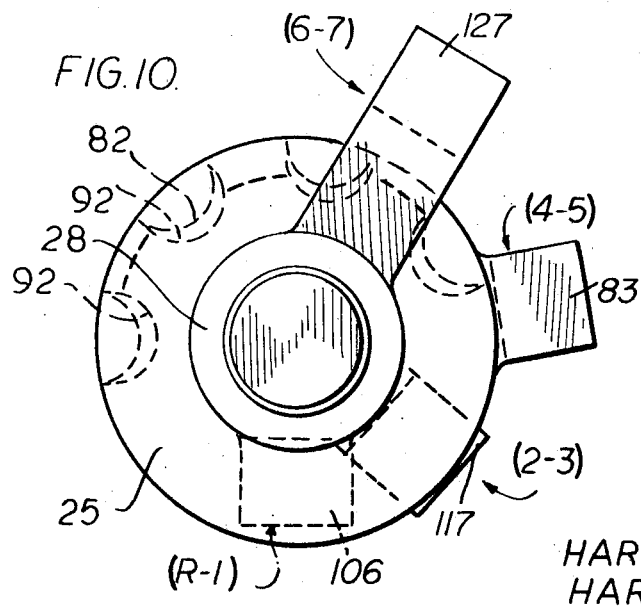

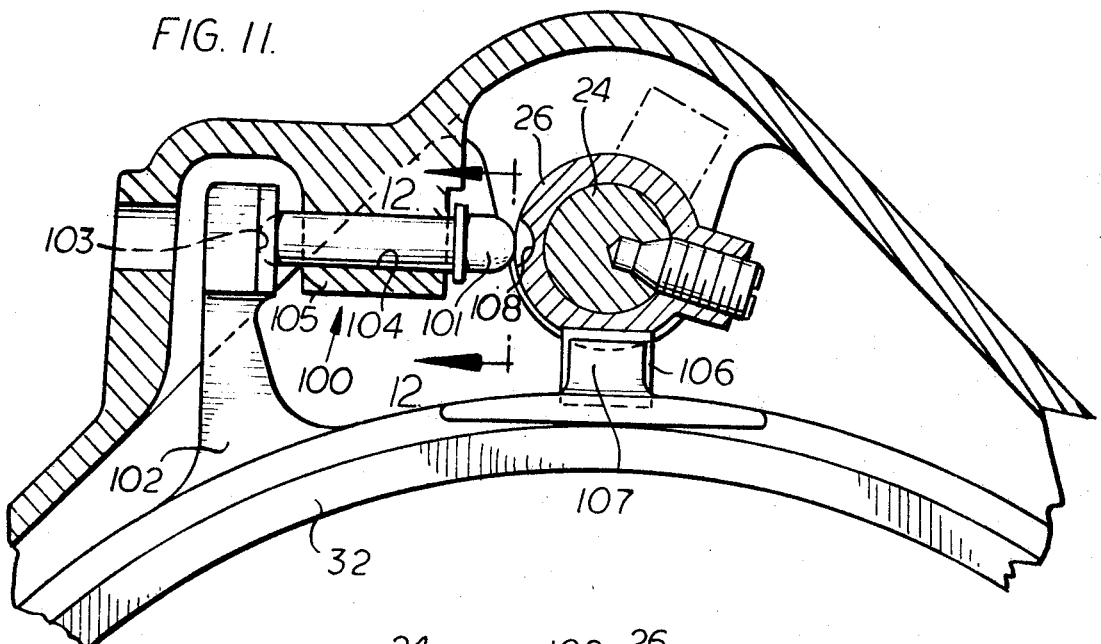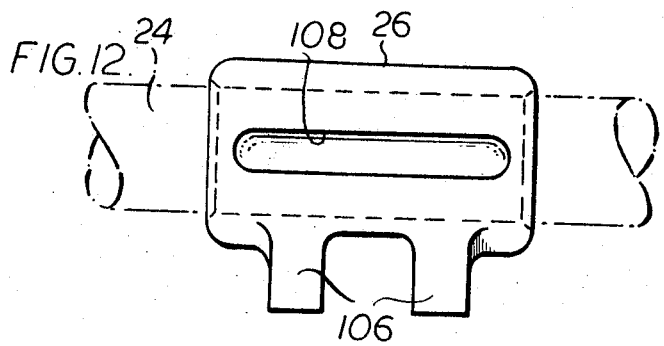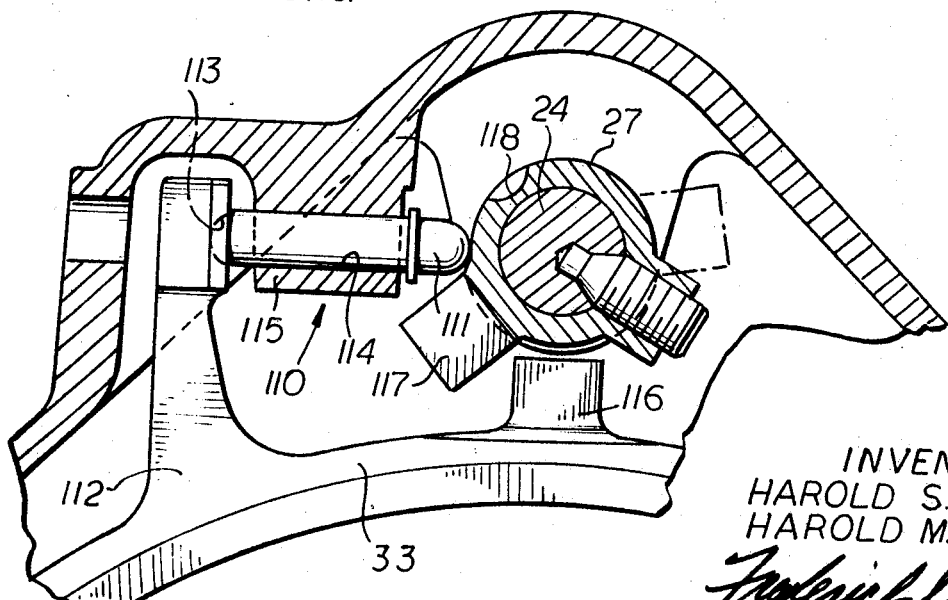

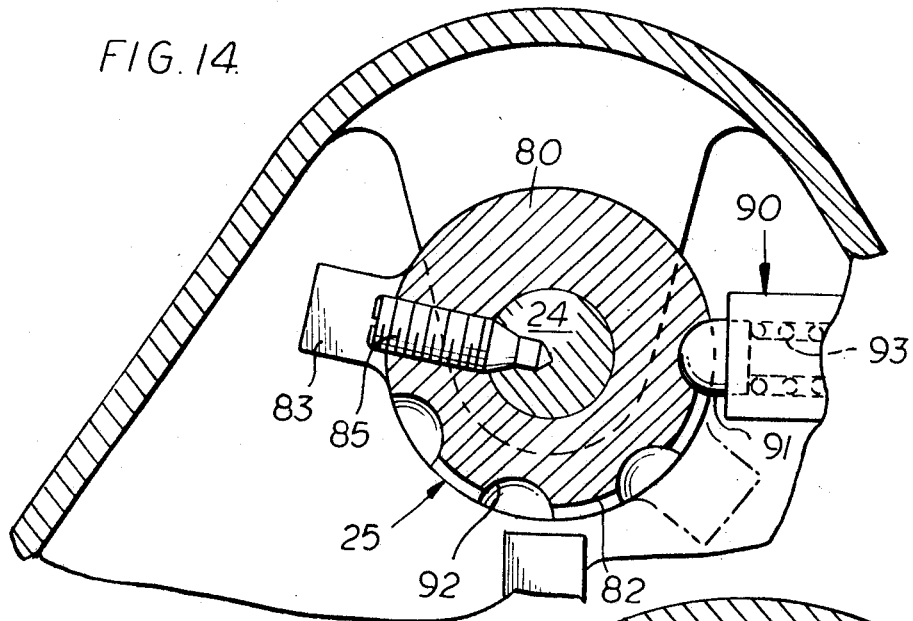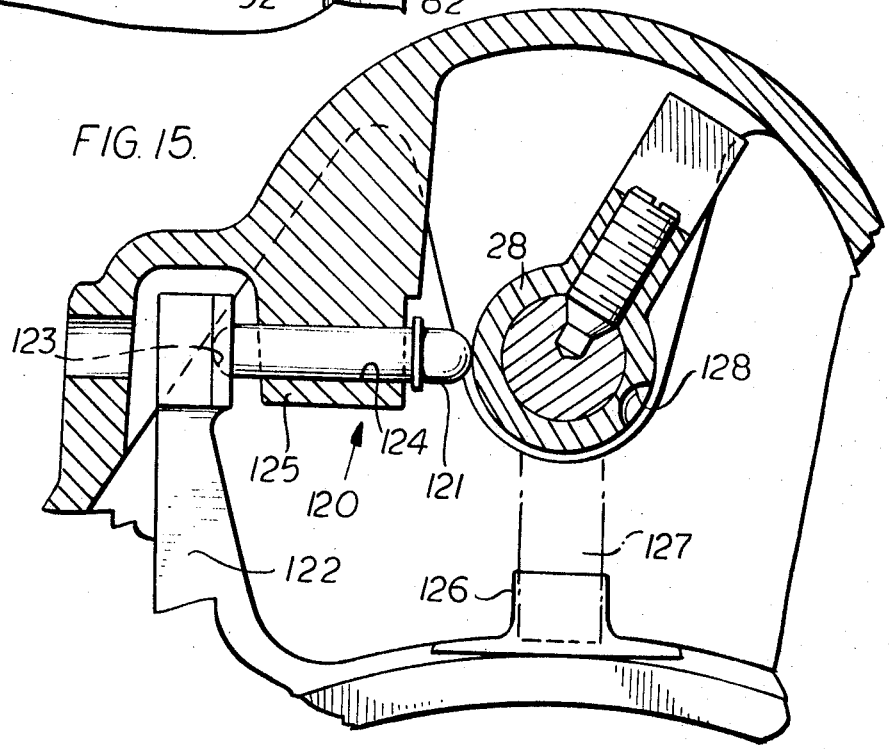

3,513,717
MONORAIL SHIFT CONTROL FOR MULTI-SPEED TRANSMISSION
Harold M. Lickey, Fort Wayne, Ind., and Harold S. Saenger, Clintonville, Wis., assignors to International Harvester Company, Chicago, Ill., a corporation of Delaware
Filed July 15, 1968, Ser. No. 746,707
Int. Cl. G05g 5/10
U.S. Cl. 74—477                9 Claims

ABSTRACT OF THE DISCLOSURE

A control mechanism for selecting and shifting the gears of a multi-speed power transmission to establish a plurality of different gear ratios in the transmission including a single reciprocal and rotatable shift rail having a plurality of longitudinally spaced, angularly staggered, radially extending flanges, each of which is individually operatively engageable only with a respective one of the shift forks or gear actuators of the transmission.

---

This invention relates to a control mechanism for selecting and shifting the gears of a multi-speed power transmission to establish a plurality of different gear ratios in the transmission and more particularly to a control mechanism for a transmission involving a single manually operable control lever and a single shift rail. The gearing may be of the countershaft synchronized type or of the planetary type conventionally used in multi-speed transmissions for trucks, tractors, and other automotive vehicles.

Manually operated tranmissions for automotive vehicles are well known. The various gear ratios are selected by the vehicle operator by the manual movement of a shift stick or lever. The movement of the stick is transmitted through a shift control mechanism or linkage so as to effectuate engagement and disengagement of the gear trains defining a particular speed ratio. When the transmission has only a limited number of gear ratios, such as three or four, the shift control mechanism may be fairly simple in structure. For larger number of gear ratios, the mechanisms for selecting the various ratios become rather complex, frequently involving a multiplicity of shift rails, of spring loaded ball detents, and perhaps even a plurality of shift levers. These mechanisms are generally more complex, more difficult to seal, more expensive, and more difficult to adjust than is necessary to accomplish the desired results.

As a matter of driver convenience and safety in vehicle operation, it is desirable that the entire shift control mechanism be as simple and positive in operation as posible. The mechanism should be so designed as to permit the operator to shift quickly and easily from one ratio to another without distraction from his driving. He should also be able to know easily and exactly what gear ratio he has selected at any instant.

The shift control mechanism of the present invention comprises a single control rail that is selectively rotated to engage any one of a plurality of gear engaging actuators and is moved longitudinally to operate a selected actuator.

It is an object to provide a single rail control mechanism that can be operated by a single manually operated shift lever or its remote counterpart that is moved longitudinally to operate an actuator and is moved laterally to rotate the shift rail. The degrees of freedom of motion of the lever are such as to allow selection and shifting of gears following a conventional "sawtooth" pattern.

The shift rail is so designed as to compensate for differences in angular displacement of the rail or for differences in dimensions or amount of required movement of the actuators so that the incremental movement of the shift lever fore and aft is the same for all gear ratios and the amount of lateral movement is also the same for all pairs of gear ratios. The shift rail is also formed with lead grooving and a detent mechanism so as to provide a "feel" to the operator as to the shift that is taking place.

It is also an object to provide an effective interlock mechanism comprising a detent engaged with an actuator and operated by the shift rail and effective to prevent unwanted inertia shifting of the transmission.

The above and other features of the invention will be more readily apparent when considered in conjunction with the drawings in which:

FIG. 1 is a top view of a multi-speed transmission housing locating the monorail shift control mechanism of the present invention in outline form;

FIG. 2 is a longitudinal side view of the shift rail of the present invention taken on line 2—2 of FIG. 1;

FIG. 3 is a sectional end view taken on line 3—3 of FIG. 1;

FIG. 4 is an enlarged fragmentary side view taken on line 4—4 of FIG. 1;

FIG. 5 is an end view taken on line 5—5 of FIG. 4;

FIG. 6 is an enlarged end view of the indexing cylinder mounted on the shift rail;

FIG. 7 is a flat projection of the outer surface of the indexing cylinder of FIG. 6;

FIG. 8 is an enlarged fragmentary view taken on line 8—8 of FIG. 7 to show the depth of the lead grooving;

FIG. 9 is an exploded perspective view of the single rail shift control;

FIG. 10 is an enlarged end view taken on line 10—10 of FIG. 1 showing the relative angular positions of the shift selector blocks;

FIG. 11 is an enlarged sectional end view taken on line 11—11 of FIG. 1 and showing the shift selector block and interlock mechanism for the R–1 shift fork;

FIG. 12 is a side view of the shift block or collar of FIG. 11;

FIG. 13 is an enlarged sectional end view of the 2–3 shaft block taken on line 13—13 of FIG. 1;

FIG. 14 is an enlarged section end view of the indexing cylinder taken on line 14—14 of FIG. 1; and FIG. 15 is an enlarged sectional end view of the 6–7 shift selector block taken on line 15—15 of FIG. 1.

Like reference characters designate like parts in the several views.

The monorail shift control mechanism of the present invention is designated generally on the drawings by the numeral 20 and is adapted to control a multi-speed transmission designated generally by the numeral 30. The transmission 30 has a housing cover 31 which supports and contains the shift control 20 and a plurality of shift yokes or forks 32, 33, 34 and 35. The transmission 30 also has appropriate gearing (not shown) which is engaged and disengaged by the forks 32–35 to provide one speed in reverse and seven forward speed driving ratios. The fork 32 engages the reverse and first speed forward ratios, or R–1; the fork 33 engages the second and third forward speed ratios, or 2–3; the fork 34 engages the 4–5; and the fork 35 the 6–7 ratios, the seventh being a direct speed ratio.

The shift control 20 comprises a single rail 21 mounted for longitudinal and angular motion within the housing 31, an external, monually operated lever mechanism 22, and a rack and pinion mechanism 23 interconnecting the lever mechanism 22 with the rail 21. The rail 21 comprises a longitudinally extending bar 24 which carries an indexing cylinder 25 and shift selector blocks or collars 26, 27 and 28. Rotation of the bar 24 brings the indexing cylinder 25 and the selector blocks 26, 27 and 28 into engagement with their respective shift forks. Longitudinal movement of the bar 24 forward causes the engagement of one gear train and movement aft causes the engagement of another gear train.

Referring to FIGS. 3 and 4, the lever mechanism 22 comprises a stick shift lever 40, a crank or shift linkage arm 41, and a shift bar 42. The lever 40 is formed with a ball end 43 which serves as a fulcrum point and is retained in a bushing 44. The bushing 44 is retained in a raised cylindrical cup 45 formed on the housing 31. A spherical compression cup 46 surrounds the lever 40 and covers the bushing 44 to prevent the entry of dirt. A spring 47 and retaining pin 48 maintain the cup 46 in close contact with the bushing 44 throughout all movement of the lever 40.

The lever 40 is bored at 50 to receive a shift linkage ball 51 carried by the arm 41. The ball 51 is attached to the lever 40 by means of a wrist pin 52. An extension shaft 53 formed integrally with the ball 51 is journalled through a cylindrical bore 54 formed in the arm 41. A suitable retainer clip or snap ring 55 located in a groove 56 formed on shaft 53 prevents longitudinal movement of the shaft 53 within the bore 54. The arm 41 is attached rigidly to the shift bar 42 by means of a set screw 57. The shift bar 42 extends longitudinally through bores 58 and 59 formed in an enlargement 60 of the housing cover 31.

The shift lever 40 is disconnected easily from the housing cover 31 by simply removing the snap ring 55.

The rack and pinion mechanism 23 comprises a relatively large diameter sector gear 70 and a small diameter spur gear or pinion 71. The hub of the sector gear 70 is attached rigidly to the shift bar 42 and rotates and moves longitudinally with it. The pinion 71 is of a smaller diameter than the indexing cylinder 25 and is affixed rigidly to it. The cylinder 25 in turn is attached rigidly to the bar 24. The teeth 72 of the sector gear 70 engage the teeth 73 of the pinion 71 and cause the indexing cylinder 25 and bar 24 to rotate as the shift bar 42 is rotated. A cylindrical hub 74 is also attached rigidly to the pinion 71 on the side opposite from the cylinder 25. The hub 74 is of substantially the same diameter as the cylinder 25 and cooperates with it to retain the gear 70 in engagement with the gear 71 and prevent sliding or relative longitudinal movement between these gears.

Referring now to FIGS. 6, 7 and 8, the indexing cylinder 25 comprises a cylindrical hub 80 formed on its outer periphery 81 with lead grooving 82 in the general form of an interconnected double H. The cylinder 25 is also formed with a pair of radially extending flanges or forks 83 adapted to operatively engage a radially extending flange 83' formed on the shift fork 34. A radial set screw 85 rigidly attaches the cylinder 25 to the bar 24.

A detent mechanism 90 is mounted in and extends through the housing 31 and has a spring loaded detent plunger 91 which engages the lead grooving 82. The detent 90 constrains the cylinder 25 to move only in the pattern defined by the lead grooving 82. Varying depths in the lead grooving 82 provide a "feel" to the vehicle operator as to the shift that is taking place. By varying the depths d and D it is possible to make shifts between certain speeds easier than others.

Increasing the depths at the terminus of each channel causes the dentent 90 to hold the transmission in the gear ratio selected until it is purposely shifted. The single detent 90 thus serves as both a guide and interlock for all gear ratios and eliminates a large plurality of balls and springs frequently found in existing shift control mechanisms.

Referring now to FIGS. 9 and 10, the control rail 21 is shown in exploded form to understand better its operation. Rotation of the shaft 42 rotates the sector gear 70 through the same angular displacement. This rotation is produced by the lateral movement of the shift lever 40. The angular displacement of the gear 71 and bar 24 is amplified by the amount of the ratio of the gear 70 to the gear 71. Progressive rotation of the bar 24 first brings a pair of radially extending flanges 106 formed on the selector block 26 into operative engagement with a radially extending flange 107 formed on the shift fork 32. Once the selector block 26 is in operative engagement with the fork 32 fore and aft movement of the shift lever 40 effects simultaneous movement of the fork 32. Such fore and aft movement of the lever 40 is transmitted through the rack and pinion mechanism 23 and rail 21 to the fork 32. Forward movement of the fork 32 engages the reverse drive gear train, and aft movement disengages the reverse drive and engages the first speed forward. Lateral rotation of the shift lever 40 causes further rotation of the bar 24 so as to disengage the selector block 26 and operatively engages a pair of radially extending flanges 117 formed on the block 27 with a radially extending flange 116 formed on the shift fork 33. Thereafter, fore and aft movement of the shift fork 33 engages the second and third speed ratios, respectively. Still further rotation of the bar 24 by lateral movement of the lever 40 disengages the block 27 and operatively engages the flanges 83 of the cylinder 25 with the radially extending flange 83' of the fork 34 for establishing the fourth and fifth ratios. Still further rotation disengages the cylinder 25 and operatively engages a pair of radially extending flanges 127 formed on the selector block 28 with a radially extending flange 126 formed on the fork 35 for the sixth and seventh ratios. By reference to FIG. 10, it can be seen that it is not possible to engage more than one ratio at a time. It will also be noted that the radially extending flanges 126, 83', 116 and 107 formed respectively on the shift forks 35, 34, 33 and 32 are substantially in longitudinal alignment and lie substantially in a common plane containing the longitudinal axis of rail 21.

An effective interlock mechanism 100 is provided with the shift control 20 so shown in FIGS. 11 and 12 for the R-1 gears, which are normally unsynchronized, to prevent inertia shifting of these gears. The same type of interlock optionally may be provided for the other gear ratios which normally are synchronized, if desired, and as shown in subsequent figures.

The interlock mechanism 100 comprises a spring loaded detent plunger 101 and an extension arm 102 formed on the shift fork 32. The plunger 101, in the locked condition, has one end in engagement with a dimple or groove 103 formed in the arm 102 and its opposite end in sliding engagement with the outer surface of the selector block 26. Thus, in its locked condition, the plunger 101 prevents longitudinal movement of the fork 32 and thereby prevents inertia shifting of the transmission into either of these gears. The plunger 101 is slidably retained in a bore 104 formed in a projection 105 inside the cover 31. When the bar 24 is rotated so that the radial flanges 106 of the selector block 26 come into engagement with the radially extending flange 107 on the fork 32, the plunger 101 becomes aligned with a longitudinally extending groove 108 formed on the side of the selector block 26. One end of the plunger 101 is then resiliently moved into the groove 108 by means of a spring (not shown) and the opposite end moves out of locking engagement with the dimple 103 of the arm 102 to thereby release the arm 102 so that the shift fork 32 is free to move. The detent 101 remains in the groove 108 as the selector block 26 is moved longitudinally to effectuate the forward or reverse shifts.

Referring to FIG. 13, a substantially identical interlock mechanism 110 is shown for the 2-3 gear ratios. While the selector block 27 is not engaged with the shift fork 33, the plunger 111 remains compressed and the fork 33 is effectively locked against longitudinal movement. The plunger 111 may slide longitudinally along the surface of the selector block 27 while other gear shifts are effectuated, but the arm 112 remains locked until the selector block 27 is moved into engagement with the radially extending flange 116 formed on the shift fork 33 and the detent plunger 111 is permitted to move into the groove 118.

In FIG. 14, a comparable interlock mechanism is not shown for the fork 34, although one might be provided. The detent 90 functions as a shift restraining mechanism by having the plunger 91 engage dimples or depressions 92 that are deeper than the rest of the grooving 82. The force of compression of the spring 93 must be overcome to permit the indexing cylinder 25 to be moved into a different position.

An interlock mechanism 120 is shown in FIG. 15 for the 6–7 gear ratios that is substantially the same as the mechanism 100. It should be noted in FIG. 15 that the length of the radial flanges 127 of the selector block 28 are shown as being substantially longer than the flanges of the other selector blocks. This is one means to compensate for possible differences in dimensions or amount of travel of the shift forks and still maintain uniform displacement of the shift lever 40 for all gear ratios.

Summarizing the operation of the complete shift control 20, reference may be made particularly to FIGS. 3 and 4. The operator of the vehicle will normally start the vehicle engine in neutral and will start to drive with the shift lever 40 moved as far to the left as possible into the R–1 range. The lever 40 may be moved forward to engage th ereverse gear or aft to engage the first speed forward gear train. Fore and aft movement of the lever 40 produces a fore and aft movement of the shift bar 42. Movement of the bar 42 carries the sector gear 70 with it which in turn causes longitudinal movement of the indexing cylinder 25 and bar 24. The longitudinal movement of the bar 24 and selector block 26 is transformed into an arcuate movement of the shift fork 32 to engage either the reverse or first speed gear trains.

A shift into second speed is accomplished by returning the shift lever 40 to neutral and moving it laterally into the 2–3 range. The lateral movement of the lever 40 produces an angular movement of the shift bar 42 and sector gear 70. Rotation of the gear 70 causes a greater rotation of the pinion 71 and bar 24. This rotation is effective to move the selector block 26 out of engagement with the fork 32 and the block 27 into engagement with the fork 33. Forward movement of the lever 40 then causes engagement of the second speed gear train as previously described. Subsequent shifts into higher speed ratios are accomplished as the vehicle speed increases by moving the lever 40 in the conventional "sawtooth" pattern until seventh speed or direct drive is obtained. Incremental movement fore and aft is the same for all gear ratios as is the lateral movement into the various gear ranges.

Considerable flexibility in location and variation of movement are permitted for driving convenience. The radius of the sector gear 70 permits the shift lever 40 to be located on one side or the other of the transmission. The lever 40 may also be located fore or aft at almost any point along the length of the shift bar 42. The amount of incremental movement of the lever 40 can be varied by varying the length of the lever or the effective ratios of the lengths L and l of the arm 41 as shown on FIGS. 4 and 5.

The degrees of freedom are such that shifting throughout the entire speed range is accomplished by the simple movement of the shift lever 40 through a spherical plane of rectangular coordinates. The manually operated shift lever 40 may be replaced by a remotely operated counterpart without affecting the operation or requiring changes in design of the interior of the shift control 20.

While a preferred embodiment of the invention has been illustrated and described, it is to be understood that the invention is not limited thereto as other variations will be apparent to those skilled in the art.

We claim:

1. A control mechanism for selecting and shifting the gears of a multi-speed power transmission to establish a plurality of different gear ratios in the transmission, including,
   a single elongated shift rail mounted for rotational movement about and reciprocal movement along its longitudinal axis;
   a plurality of longitudinally spaced shift forks, each of said shift forks being operatively associated with certain gears of the transmission and having a flange projecting therefrom, each of said flanges being movable longitudinally in opposite directions from a neutral position to establish certain gear ratios in the transmission, said shift fork flanges being substantially in longitudinal alignment and lying substantially in a common plane containing the longitudinal axis of said shift rail; a plurality of longitudinally spaced selector blocks fixedly carried by said shift rail, each of said selector blocks having radially extending means for operatively engaging a respective one of said shift fork flanges, said selector block means being angularly oriented about the longitudinal axis of said shift rail and each selector block means being angularly spaced from the other selector block means whereby only one of said selector block means is operatively engageable with its respective shift fork flange at any one time;
   means for imparting rotational movement to said shift rail for selectively positioning and effecting operative engagement of each selector block means with its respective shift fork flange when the shift fork is in its neutral position; means for imparting reciprocal longitudinal movement to said shift rail for effecting simultaneous longitudinal movement of the selectively positioned selector block means and the shift fork flange operatively engaged therewith; and indexing means to constrain said shift rail to rotate and reciprocate in a predetermined pattern for effecting operative engagement of each selector block means and its respective shift fork flange and actuation of such shift fork flange.

2. A control mechanism as set forth in claim 1, wherein said indexing means comprises a cylindrical hub fixedly secured on said shift rail and having lead grooving on its outer peripheral surface, and a spring-loaded plunger carried by a stationary part of the transmission, said plunger having an end portion resiliently urged into frictional engagement with said lead grooving.

3. A control mechanism as set forth in claim 2, wherein said lead grooving includes a plurality of circumferentially spaced, longitudinally extending grooves of substantially the same length and a circumferentially extending groove intersecting a mid portion of each of said longitudinally extending grooves.

4. A control mechanism as set forth in claim 3, wherein said means for imparting rotational movement to said shift rail includes gear means carried by said shift rail, and a rotatable sector gear in meshing engagement with said gear means.

5. A control mechanism as set forth in claim 4, including an elongated shift bar having its longitudinal axis spaced and substantially parallel to the longitudinal axis of said shift rail, said sector gear being fixedly secured to said shift bar; means for supporting said shift bar for rotational movement about and reciprocal movement along the longitudinal axis of said shift bar; and said means for imparting reciprocal longitudinal movement of said shift rail includes retaining means for preventing relative movement between said sector gear and said gear means and constraining said shift bar and shift to reciprocate longitudinally in unison.

6. A control mechanism as set forth in claim 5, further including a manually operable shift lever; means for pivotally supporting said shift lever whereby said shift lever is swingable in generally vertical, longitudinal plane containing the longitudinal axis of said shift bar and in a generally vertical transverse plane perpendicular with respect to said longitudinal plane; and means for operatively connecting said manually operable shift lever to said sector gear whereby swinging of said shift lever in said longitudinal plane effects simultaneous longitudinal movement of said sector gear and swinging of said shift lever in said transverse plane effects simultaneous rotation of said sector gear.

7. A control mechanism as set forth in claim 6, further including releasable lock means operatively interposed between at least one of said shift forks and its respective selector block for locking said shift fork in its neutral position, said lock means being releasable upon rotation of said selector block to effect operative engagement of the selector block means associated therewith is in operative engagement with its respective shift fork flange.

8. A control mechanism as set forth in claim 7, wherein said selector block includes a cylindrical hub fixedly secured on said shift rail having a longitudinally extending groove on its outer peripheral surface; and wherein said releasable lock means includes a plunger supported for sliding movement along its longitudinal axis, said plunger longitudinal axis being substantially perpendicular to the longitudinal axis of said shift rail, said plunger being slidable between a first position wherein one end portion thereof operatively engages said shift fork to prevent movement thereof from its neutral position while its opposite end portion frictionally engages the outer peripheral surface of said selector block cylindrical hub and a second position wherein said one end portion of said plunger is out of engagement with said shift fork, and spring means yieldably urging said plunger toward its second position, said plunger being restrained from moving to its second position until said selector block cylindrical hub groove is moved into alignment with said plunger to permit said opposite end portion thereof to frictionally engage said groove.

9. A control mechanism as set forth in claim 8, wherein the depth of a certain section of said lead grooving is less than the depth of the rest of the lead grooving.

References Cited
UNITED STATES PATENTS

| | | | |
|---|---|---|---|
| 1,938,796 | 12/1933 | Bernard | 74—476 |
| 1,946,750 | 2/1934 | Matthews | 74—473 |
| 3,431,791 | 3/1969 | Labat | 74—473 |

MILTON KAUFMAN, Primary Examiner

U.S. Cl. X.R.

74—475